United States Patent
Cao et al.

(10) Patent No.: US 10,867,723 B2
(45) Date of Patent: Dec. 15, 2020

(54) LIQUID-COOLED TANGLE RESISTANT CHARGE CABLE

(71) Applicant: Faraday&Future Inc., Gardena, CA (US)

(72) Inventors: Chi Hung Cao, Huntington Beach, CA (US); Mike de Jung, Marina del Rey, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 195 days.

(21) Appl. No.: 15/720,181

(22) Filed: Sep. 29, 2017

(65) Prior Publication Data

US 2018/0190410 A1     Jul. 5, 2018

Related U.S. Application Data

(60) Provisional application No. 62/402,931, filed on Sep. 30, 2016.

(51) Int. Cl.
| | |
|---|---|
| *H02H 7/00* | (2006.01) |
| *H01B 7/42* | (2006.01) |
| *H01B 7/18* | (2006.01) |
| *H01B 7/00* | (2006.01) |
| *H01B 7/04* | (2006.01) |
| *H02H 5/04* | (2006.01) |
| *H01B 7/24* | (2006.01) |
| *H01B 7/02* | (2006.01) |
| *H01B 9/00* | (2006.01) |
| *B60L 53/18* | (2019.01) |
| *B60L 53/14* | (2019.01) |

(52) U.S. Cl.
CPC .............. *H01B 7/425* (2013.01); *B60L 53/14* (2019.02); *B60L 53/18* (2019.02); *H01B 7/0009* (2013.01); *H01B 7/02* (2013.01); *H01B 7/04* (2013.01); *H01B 7/185* (2013.01); *H01B 7/24* (2013.01); *H01B 9/006* (2013.01); *H02H 5/042* (2013.01); *H01B 7/0018* (2013.01)

(58) Field of Classification Search
None
See application file for complete search history.

(56) References Cited

U.S. PATENT DOCUMENTS

| | | | | |
|---|---|---|---|---|
| 3,989,884 A | * | 11/1976 | Friedrich ................. | H01B 7/29 174/15.6 |
| 4,912,446 A | * | 3/1990 | Singh ....................... | H01F 6/06 174/129 R |

(Continued)

*Primary Examiner* — Stephen W Jackson
(74) *Attorney, Agent, or Firm* — Veros Legal Solutions, LLP (57) ABSTRACT

A liquid-cooled tangle-resistant charging cable may include a sheath defining a cavity, the sheath having a width dimension, a height dimension, a thickness dimension and a length dimension; wherein the width dimension is larger than the height dimension, and the length dimension is larger than both the height dimension and the width dimension; a first conductor disposed in the cavity, the first conductor having at least one substantially flat side; a hose disposed in the cavity and configured to carry a cooling liquid, the cross-sectional profile of the hose being non-circular and having at least one flat side. In some embodiments, the sheath's cross-sectional height dimension may be between 2% and 95% of the sheath's cross sectional width dimension.

15 Claims, 7 Drawing Sheets

(56) References Cited

U.S. PATENT DOCUMENTS

| | | | |
|---|---|---|---|
| 5,670,860 A * | 9/1997 | Conrady | H01B 7/423 320/109 |
| 6,396,241 B1 * | 5/2002 | Ramos | B60L 53/34 320/108 |
| 2017/0338006 A1 * | 11/2017 | Gontarz | H01B 7/423 |
| 2018/0186315 A1 * | 7/2018 | Terzis | H02G 15/007 |

* cited by examiner

LIQUID-COOLED TANGLE RESISTANT CHARGE CABLE

CROSS-REFERENCE TO RELATED APPLICATIONS

This application claims the benefit of U.S. Provisional Application No. 62/402,931, filed Sep. 30, 2016, the entirety of which is hereby incorporated by reference.

FIELD

The present disclosure is generally related to electric charging technologies, and more particularly to liquid-cooled tangle resistant charge cables.

BACKGROUND

Modern charging cables have a tendency to become tangled and a tendency to overheat. Ever increasing current flow requirements combined with the desire for smaller, sleeker charging cable designs further magnify these problems. To prevent charging cables from overheating, some modern designs employ liquid-cooling to counter rising temperatures caused by heat coming off internal conductors. However, currently available liquid-cooled cables do not adequately resist tangling, bending and/or crimping during use, which can cause that the liquid-cooling functionality of the cable may be inhibited (e.g. liquid flow may slow or stop) and overheating may ensue. Additionally, current designs do not have an effective failsafe mechanism in place to terminate charging when the liquid-cooling mechanism becomes compromised and operating temperatures rise. It is well-known in the art that significant overheating of charging cables may damage internal components and/or present safety hazards (to users, equipment, and the environment). Another drawback of currently available liquid-cooled charge cables is that they do not effectively utilize the surface area of the cooling facility relative to the conductors, while simultaneously offering a tangle resistant structure.

SUMMARY

The present disclosure is directed to liquid-cooled tangle-resistant (LCTR) charging cables. Exemplary LCTR charging cables may include: a sheath defining a cavity, the sheath having a width dimension, a height dimension, a thickness dimension and a length dimension; wherein the width dimension is larger than the height dimension, and the length dimension is larger than both the height dimension and the width dimension; a first conductor disposed in the cavity, the first conductor having at least one substantially flat side; a hose disposed in the cavity and configured to carry a liquid, the cross-sectional profile of the hose being non-circular and having at least one flat side. In some embodiments, the LCTR charging cable of the instant disclosure may further include a second conductor, a third conductor and/or any other number of conductors disposed within the sheath. In some embodiments, the LCTR charging cable of the instant disclosure further includes a first insulation jacket disposed in the cavity and configured to cover at least a portion of the first conductor. In some embodiments, any other number of conductors disposed in the cavity of the sheath may likewise be covered at least partially by insulation jackets (e.g. a second insulation jacket, a third insulation jacket, etc.). In some embodiments, LCTR charging cables of the instant disclosure further include a ground conductor disposed within the cavity.

In some embodiments, LCTR charging cables of the instant disclosure are configured such that the substantially flat side of the hose abuts between 15% and 100% of the substantially flat side of the first conductor by surface area. In some embodiments, LCTR charging cables of the instant disclosure are configured such that the substantially flat side of the hose abuts between 15% and 100% of the substantially flat side of the first conductor by surface area, and between 15% and 100% of the substantially flat side of the second conductor by surface area. In some embodiments, LCTR charging cables of the instant disclosure are configured such that the substantially flat side of the hose abuts between 15% and 100% of the substantially flat side of the first conductor by surface area, and between 15% and 100% of the substantially flat side of the second conductor by surface area, and between 15% and 100% of the substantially flat side of the third conductor by surface area.

In some embodiments, LCTR charging cables of the instant disclosure are configured such that the substantially flat side of the hose abuts between 15% and 100% of the substantially flat side of the first insulation jacket by surface area. In some embodiments, LCTR charging cables of the instant disclosure are configured such that the substantially flat side of the hose abuts between 15% and 100% of the substantially flat side of the first insulation jacket by surface area, and between 15% and 100% of the substantially flat side of the second insulation jacket by surface area. In some embodiments, LCTR charging cables of the instant disclosure are configured such that the substantially flat side of the hose abuts between 15% and 100% of the substantially flat side of the first insulation jacket by surface area, and between 15% and 100% of the substantially flat side of the second insulation jacket by surface area, and between 15% and 100% of the substantially flat side of the third insulation jacket by surface area.

In some embodiments, LCTR charging cables of the instant disclosure are configured such that the first conductor comprises multiple metallic wires bundled together such that the outer cross-sectional profile of the bundled metallic wires is substantially rectangular. In some embodiments, LCTR charging cables of the present disclosure are configured such that the sheath is made of a material that changes pigment based on changes in temperature. In some implementations, the LCTR charging cables of the present disclosure include a thermistor coupled to the first conductor, wherein current flow is reduced responsive to the thermistor signaling that the temperature of the first conductor is above a predefined level. In some implementations, the LCTR charging cables of the present disclosure include a thermistor coupled to the first conductor, wherein current flow is terminated responsive to the thermistor signaling that the temperature of the first conductor is above a predefined level.

In some implementations of LCTR charging cable of the present disclosure, the sheath is configured to display a bending stiffness in a first direction (or about a first axis) that is greater than the bending stiffness in a second direction (or about a second axis). In some such instances the first axis and the second axis are orthogonal.

In some implementations, the LCTR charging cables of the present disclosure include an armor layer disposed between the sheath and the first insulation jacket, wherein the armor layer is configured with a bending stiffness in a first direction (or about a first axis) that is greater than the bending stiffness in a second direction (or about a second axis).

In some embodiments of the LCTR charging cables of the present disclosure, the sheath's cross-sectional height dimension is between 2% and 95% of the sheath's cross sectional width dimension.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

BRIEF DESCRIPTION OF THE DRAWINGS

Various embodiments are disclosed herein and described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration, these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Figure 1:
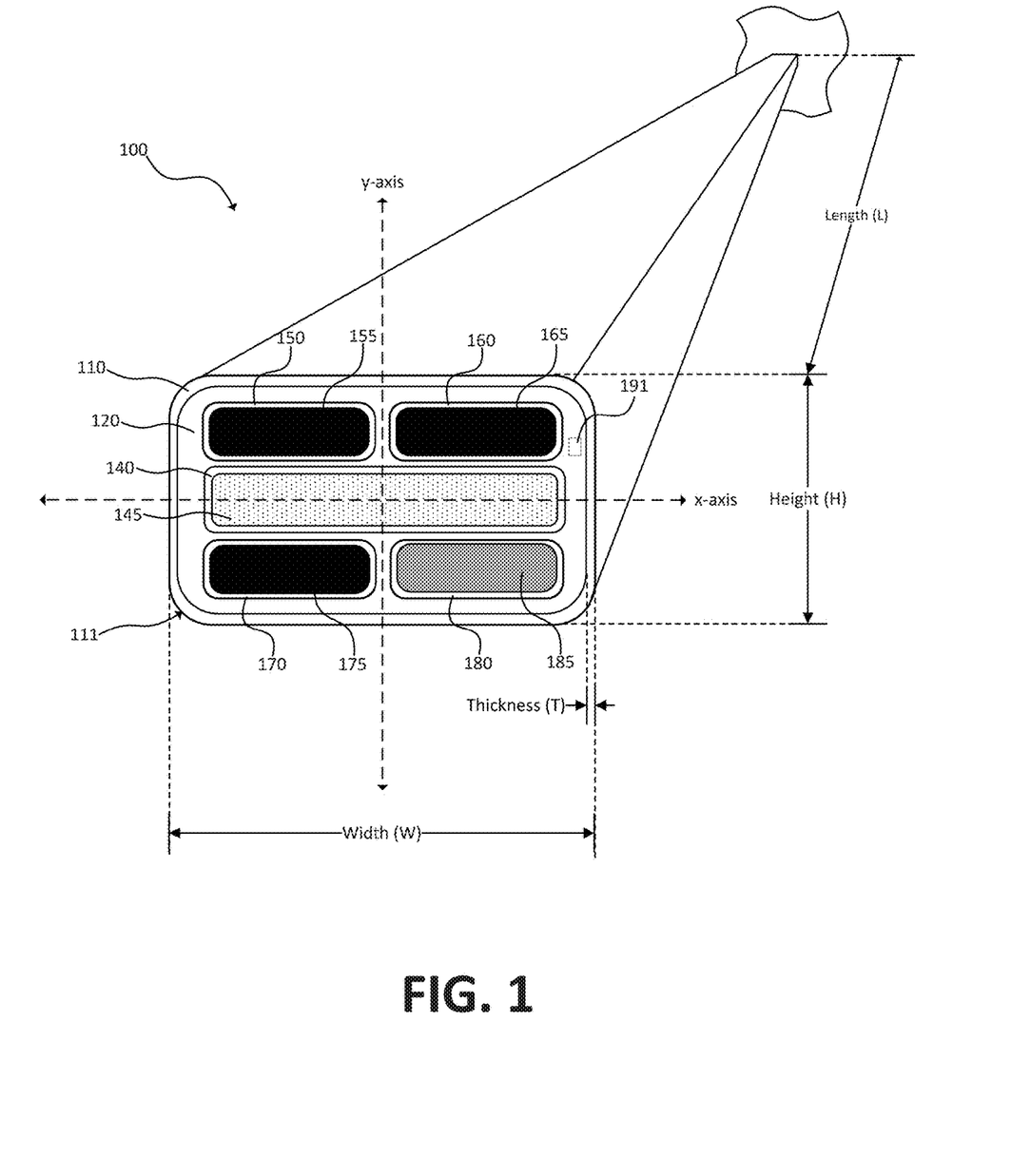
FIG. 1 depicts a cross-section perspective view of a three-phase LCTR charging cable in accordance with one or more embodiments of the present disclosure.

FIG. 1 illustrates a cross-section perspective view of a three phase LCTR charging cable in accordance with one or more embodiments of the present disclosure. As depicted, LCTR charging cable 100 may include a sheath 110 defining a cavity 120 configured to stow one or more internal components. As shown, internal components in accordance with one or more embodiments of the present disclosure may include: a hose 140 disposed within the cavity and configured to contain or otherwise enclose liquid coolant 145; a first conductor 155, and/or a second conductor 165, and/or a third conductor 175 disposed within cavity 120 and configured to carry electric current; and/or a ground conductor 185 configured to provide an Earthing return path for electric current. In some embodiments, as shown, first conductor 155 and/or second conductor 165 and/or third conductor 175 and/or ground conductor 185 may be carried within first insulator jacket 150, second insulator jacket 160, third insulator jacket 170, and/or fourth insulator jacket 180, respectively. In some embodiments, LCTR charging cable 100 may include one or more sensor(s) 191, one or more fillers 120, and/or one or more other layers, structures, or components to provide support, protection, insulation, and/or functionality to the liquid-cooled tangle resistant charging cable technology of the present disclosure. Each of the foregoing will now be discussed in more detail.

As depicted, sheath 110 may be an elongate tube having a width (W) dimension, a height (H) dimension, a thickness (T) dimension, and/or a length (L) dimension. Although depicted as a straight tube along the length (L) dimension, LCTR charging cable 100 may be flexible along its length, and/or along any one or more of its dimensions (e.g. twist). LCTR charging cables in accordance with embodiments of the present technology, however, are configured to be more flexible in some dimensions than others. To achieve an asymmetrical flexibility property (e.g., unequal bending strengths about different axes), exemplary embodiments of the LCTR charging cable 100 may include a sheath 110 that displays an inner and/or outer cross-sectional profile that is substantially non-circular. Though FIG. 1 depicts sheath 110 as having a substantially rectangular profile, one of ordinary skill in the art will appreciate, upon reviewing this disclosure, that the inner or outer surface of the wall of sheath 110 may display any non-circular profile that, alone or in combination with one or more of the components stowed within sheath 110, displays a greater bending stiffness in a first direction than in a second direction (such first and second directions may or may not be orthogonal). For example, the sheath may display an inner or outer cross-sectional profile that is substantially rectangular, pill-shaped, triangular, trapezoidal, or any other non-circular shape without departing from the scope of the present disclosure. Variations of the non-circular shapes discussed herein are also contemplated as falling within the scope of this disclosure. For example, a "substantially rectangular" profile as used herein may refer to a profile following a true rectangular outline; or, in other instances, it can refer to a profile following a substantially rectangular outline, but displaying one or more minor variations or modifications (e.g., a rectangular profile with one or more rounded or beveled corners, one or more sides having a slightly wavy surface, etc.). All such modifications and variations are contemplated as falling within the scope of the present disclosure.

For instance, as shown in FIG. 1, sheath 110 may have an inner and/or outer cross-sectional profile that is substantially rectangular (here displaying rounded corners, e.g., corner 111). The non-circular profile of sheath 110, alone or in combination with the structural support provided by any of the components stowed therein (e.g. one or more of the components associated with numerals 110-191), may be configured to resist bending about a first axis more than about a second axis, thereby inhibiting tangle-prone movements of the LCTR charging cable 100. For example, by employing a substantially rectangular profile as shown in FIG. 1, LCTR charging cable 100 may display a greater bending stiffness when bent about the y-axis, and display a lesser bending stiffness when bent about the x-axis. Because of the unequal bending stiffness properties provided by the non-circular configurations of the present disclosure, the LCTR charging cable may achieve the flexibility users desire (achieved by easy bending in at least one direction (i.e. lower bending stiffness); here, in the direction of the y-axis), but inhibit tangling on account of its limited flexibility in other directions (achieved by greater bending stiffness in at least one other direction; here, in the direction of the x-axis). It should be recognized that, although the foregoing discussion of bending about axes is made with reference only to sheath 110's two axes of symmetry (e.g. the x-axis and the y-axis), the present disclosure is not limited to embodiments which only display different bending stiffness properties as between axes of symmetry. Indeed, in many embodiments of the present disclosure, the general shape of sheath 110 has no axes symmetry, or only one axis of symmetry. Accordingly, it should be understood first and second axis about which bending is resisted disparately may be described/defined by any pair of different lines within and/or intersecting the plane of the cross-section of sheath 110. It should also be noted that the first and second axes may or may not be orthogonal.

As shown, the first conductor 150 of LCTR charging cable 100 may have a non-circular cross-sectional profile with at least one substantially flat side. In some embodiments the at least one substantially flat side of the first conductor extends a distance that amounts to 10% or more of the total perimeter of the conductor. In some instances, the first conductor 150 displays substantially rectangular cross-section with four substantially flat sides (as shown in FIG. 1), the first conductor 155 having a width (W) dimension that is different than its height (H) dimension, and having a length (L) dimension that substantially matches the length (L) dimension of the sheath 110 (e.g. first conductor 155 length (L) dimension measuring between 90% and 110% of the sheath 110 length (L) dimension). As shown, second conductor 165 and/or third conductor 175 and/or ground conductor 185 may, in some instances, display similar characteristics as first conductor 155. That is, second conductor 165 and/or third conductor 175 and/or ground conductor 185 may have a non-circular cross-sectional profile with at least one substantially flat side. Also, second conductor 165 and/or third conductor 175 and/or ground conductor 185 may, in some instances, may have a width (W) dimension that is different than its height (H) dimension, and having a length (L) dimension that substantially matches the length (L) dimension of the sheath 110 (e.g. second/third/ground conductor length (L) dimension(s) measuring between 80% and 120% of the sheath 110 length (L) dimension). Although FIG. 1 depicts first conductor 155, second conductor 165, third conductor 175 and ground conductor 185 as each being a solid unit of material (e.g. a single conducting wire), any one or more of the foregoing conductors may comprise multiple pieces (e.g. multiple smaller strands) of conductor material arranged in parallel, in series, or in any other arrangement, the collection of multiple conductor pieces together arranged to display at least one substantially flat side. For example, first conductor 155 may be comprised of a collection of wires twisted or weaved together in a manner that, collectively, provides a non-circular cross-sectional profile having at least one substantially flat side (shown/explained in more detail with reference to FIG. 2).

In some embodiments, a hose 140 may be provided within the cavity of the sheath 110 to contain and/or direct the cooling liquid 145. In such exemplary embodiments, as shown in FIG. 1, hose 140 may have an inner and/or outer cross-sectional profile that is substantially non-circular and having at least one substantially flat side. The hose 140 may be positioned within the cavity of sheath 110 such that the at least one substantially flat side of hose 140 is positioned near, abutted against, and/or placed adjacent to one or more of a substantially flat side of one or more of the first conductor 155, the second conductor 165, the third conductor 175, the ground conductor 185, and/or a first insulation jacket 150 covering the first conductor 155, a second insulation jacket 160 covering the second conductor 165, a third insulation jacket 170 covering the third conductor 175, and/or a ground insulation jacket 180 covering the ground conductor 185. In some embodiments, the hose 140 and/or conductors are arranged such that one or more of the first conductor 155, the second conductor 165, the third conductor 175, the ground conductor 185, and/or the first insulation jacket 150, the second insulation jacket 160, the third insulation jacket 170 and/or the ground insulation jacket 180 is arranged such that at least a portion of at least one of its/their substantially flat side(s) is flush with at least a portion of the at least one substantially flat side of hose 140.

Although not required, FIG. 1 depicts the conductors as being covered or otherwise contained within the hollow of insulation jacket(s) that are distinct from filler 120. It should be understood that such an arrangement is not required in all embodiments of the present disclosure, and is merely depicted here as an exemplary, non-limiting embodiment. In some instances filler 120 may provide the only insulation barrier necessary for successful operation of the LCTR charging cable 100. Similarly, in some instances filler 120 may comprise a material or mixture of materials that can provide both the insulation barrier between conductor(s) as well as the liquid-containing features described above with reference to hose 140 (thereby obviating the need for a distinct hose 140 separate from that provided by filler 120. Materials that may be used as filler 120 may include one or more of: rubber, plastic, and/or any flexible materials.

Referring back now to FIG. 1, depicting distinct insulation jackets covering the conductors, it should be appreciated by one of ordinary skill in the art that "covering" as used herein does not necessarily imply a complete cover. In many embodiments of the present technology, insulation jackets 150, 160, 170, 180 may only cover a portion of the corresponding conductor. For example, the insulation jacket in some instances may take the form of an elongate tube that covers most of the conductor along its length, but leaves the conductor at least partially exposed at its ends.

With reference still to FIG. 1, LCTR charging cable 100 may include a cooling liquid 145 configured to effectuate and/or enable heat transfer from one or more components carried within sheath 110 to another area, component, or device that either uses or dissipates it. In some embodiments, the cooling liquid has coolant has high thermal capacity, low viscosity, non-toxic properties, is chemically inert, and/or is electrically insulating. For example, in some embodiments cooling liquid 145 may include one or more coolant such as: water, and/or any dielectric fluid. The ability of the cooling liquid 145 to dispel, absorb, and/or transfer heat put off by the one or more of the conductor(s) is directly related to the cooling liquid 145's proximity to the one or more conductors (the greater the surface area of the conductor that is brought near to a greater surface area of the liquid, the greater capacity for the liquid coolant to provide its cooling functionality). As shown in FIG. 1, by utilizing a hose 140 with a substantially flat edge 140 abutted up against (or near) a substantially flat edge of a conductor or an insulator jacket covering the conductor (e.g. first insulation jacket 150 covering first conductor 155), the cooling liquid 145 is brought closer in proximity to the conductor over a larger surface area of the conductor than practically possible in conventional charge cables. It should be noted that "abut" and "adjacent" as used on the present disclosure do not necessarily require touching or in-contact (although in some embodiments that may well be the case), but instead may also mean close but not touching. In particular, the edge-to-edge distance between the conductor (e.g. first conductor 155) and the cooling liquid 145 along 5% or more of total perimeter of the conductor may be between 0 mm (e.g. in direct contact) and 25 mm. Additionally, some embodiments of the present disclosure may fall above or below these ranges depending on the application.

In some embodiments, the substantially flat side of hose 140 abuts between 15% and 100% by surface area of the substantially flat side of the first insulation jacket 150. In some embodiments, the substantially flat side of hose 140 abuts between 15% and 100% by surface area of the substantially flat side of the first insulation jacket 150, and between 15% and 100% of a substantially flat side of the second insulation jacket 160. In some embodiments, the substantially flat side of hose 140 abuts between 15% and 100% by surface area of the substantially flat side of the first insulation jacket, and between 15% and 100% of a substantially flat side of the second insulation jacket 160, and between 15% and 100% of a substantially flat side of the third insulation jacket 170. In some embodiments, the substantially flat side of hose 140 abuts between 15% and 100% by surface area of the substantially flat side of the first insulation jacket 150 and/or the second insulation jacket 160 and/or the third insulation jacket 170 and/or the ground insulation jacket 180.

As shown, in some embodiments LCTR charging cable 100 may include one or more sensor(s) 191 configured to determine one or more of a temperature measure, a current measure, and/or a stress measure and/or generate a signal indicating the same. Such sensor(s) 191 may be coupled with and/or carried by any one or more of the foregoing components (e.g. one or more of the components associated with numerals 110-185 in FIG. 1). For example, in some embodiments, sensor 191 may include a thermistor coupled to one or more of the first conductor 155, and/or the second conductor 165 and/or the third conductor 175. Such a sensor 191 (e.g. a thermistor) may be coupled with control logic or physical computer processor configured to execute machine readable instructions that, when executed, effectuate a termination or reduction in current flow in one or more of the conductors coupled thereto. Execution of such instructions causing termination or reduction in current flow may be in response to a signal from sensor 191 indicating the temperature in one or more of the conductors (or any other part of the LCTR charging cable 100) rises above a predefined level (e.g. a predefined safe operating temperature range or threshold temperature).

In some embodiments, the LCTR charging cable 100 may be configured to provide visual indicia of current temperatures to a user of the LCTR charging cable 100. For example, sensor 191 may be coupled to a light source visible to the user, where the sensor 191 may actuate the light source to display different colors or blinking patterns associated with various temperatures. For example, the sensor 191 may actuate an LED to project green light when operating temperatures are within a safe range, and/or the sensor 191 may actuate the same or a different LED to project red light when operating temperatures are unsafe. In other embodiments, sheath 110 is made of a material that includes a component causing the pigment of the material to changes with temperature, thereby providing a user with visual indicia of temperature which may include an indication that a present temperature is safe/unsafe or otherwise desirable or undesirable. One or ordinary skill in the art will recognize upon reviewing the instant disclosure that any modifications, alterations, combinations, and or variations of sensors and visual indicia may be employed to convey to a user a temperature, a current measure, and/or a stress measure present in all or a portion of LCTR charging cable 100.

With reference still to FIG. 1, it should be recognized that space within the cavity of sheath 110 not otherwise occupied by one or more of the internal components described above may, in some embodiments, be occupied by a filler 120. The filler 120 may provide support, strength, insulation and/or structure to the LCTR charging cable 100. Also, as will be discussed in more detail herein, in some embodiments other layers, structures, and/or components may be disposed within the cavity 120 to provide added protection of the internal components. For instance, an armor layer (depicted in FIG. 2) may be provided inside the cavity to provide added protection to the internal components of LCTR charging cable 100, and to augment the bending and/or twisting properties displayed by the LCTR charging cable 100.

Figure 2:
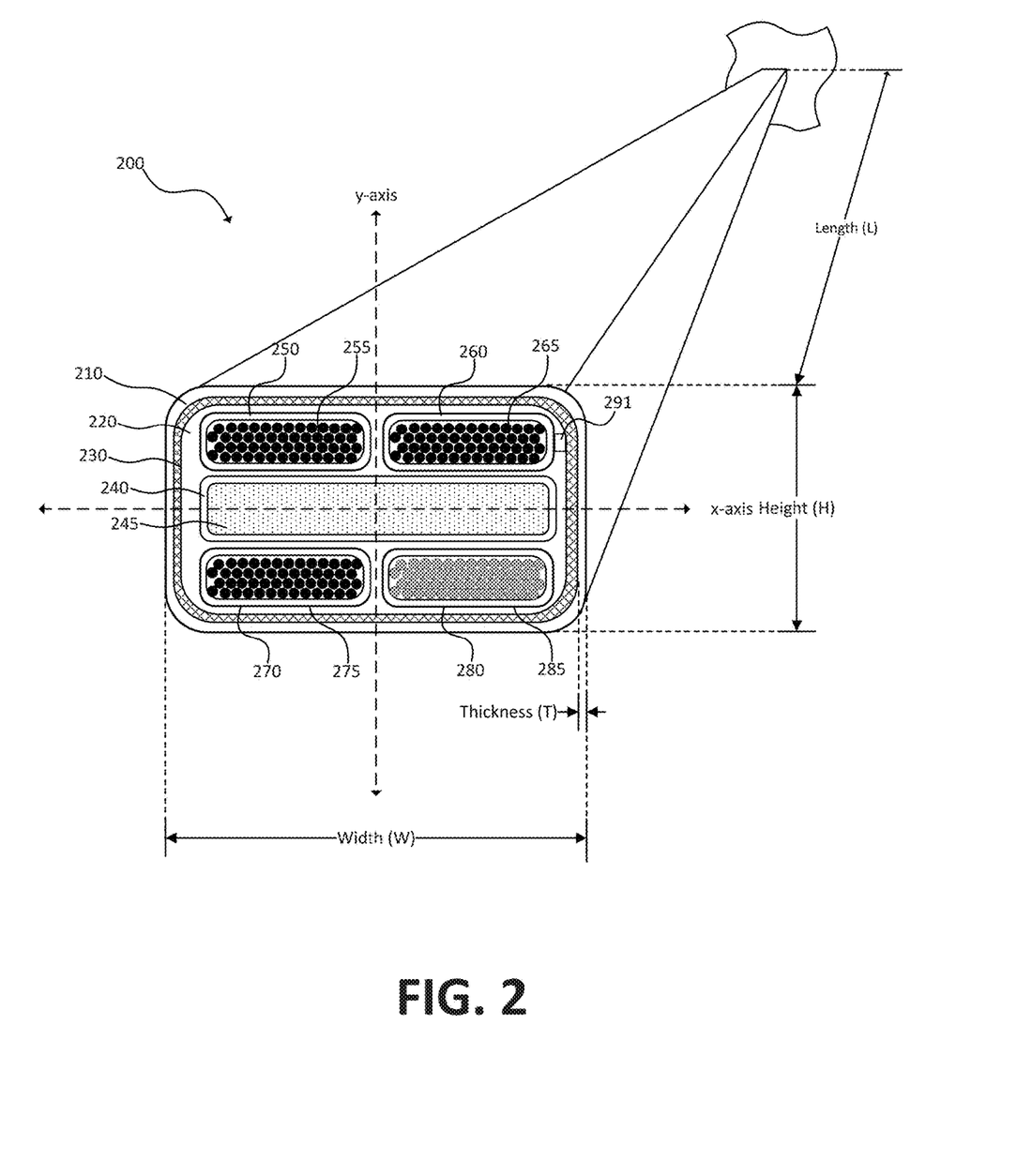
FIG. 2 depicts a cross-section perspective view of a three-phase LCTR charging cable in accordance with one or more embodiments of the present disclosure.

FIG. 2 depicts a cross-section perspective view of a three-phase LCTR charging cable in accordance with one or more embodiments of the present disclosure. The LCTR charging cable 200 of FIG. 2 is similar to the LCTR charging cable 100 of FIG. 1, but here the embodiment includes an armor layer 230 as discussed above, and conductors comprising multiple bundled conductor components. As shown in FIG. 2, in some embodiments of the present technology the first conductor 255 may be made up of multiple pieces (e.g. multiple smaller strands) of conductor material bundled together such that, collectively, they display a non-circular cross-sectional profile having at least one substantially flat side. For example, first conductor 255 may be comprised of a collection of wires twisted or weaved together in a manner that, collectively, provides a non-circular cross-sectional profile having at least one substantially flat side.

As shown in FIG. 2, an armor layer 230 may be disposed inside the cavity of sheath 210 to provide added protection to the internal components of the LCTR charging cable 200, and/or to augment the bending and/or twisting properties displayed by the LCTR charging cable 200. In some embodiments, such armor layer 230 may be disposed between the inner surface of the sheath 210 and outer surface of a first insulation jacket 250 and/or a second insulation jacket 260 and/or a third insulation jacket 270 and/or a ground insulation jacket 280. In some instances, the armor layer 230 is configured with a bending stiffness about a first axis (e.g. in a first direction) that is greater than the bending stiffness about a second axis (e.g. in a second direction). In some embodiments the first and second axes are orthogonal. In some embodiments, armor layer may be configured to resist bending about a first axis (e.g., y-axis) more so than about a second axis (e.g., x-axis), thereby inhibiting tangle-prone movements or conformations of the LCTR charging cable 200. For example, by armor layer 230 employing a substantially rectangular profile as shown in FIG. 2, LCTR charging cable 200 may display a greater bending stiffness when bent about the y-axis, and display a lesser bending stiffness when bent about the x-axis.

Similar to FIG. 1, FIG. 2 depicts a hose 240 provided within the cavity of the sheath 210 to contain and/or direct cooling liquid 245. In some embodiments, hose 240 may be operatively coupled to a pump (not shown) configured to effectuate or control liquid flow through the interior of the hose 240. In some embodiments, hose 240 may be operatively coupled to a pump configured to increase or decrease liquid pressure within the hose 240. Sensor 191 may be operatively coupled to control logic or physical computer processor(s) configured to execute machine readable instructions that, when executed, effectuate an increase or decrease in liquid pressure within hose 240 responsive to a sensor 291 generating a signal that provides indicia that there has been: (i) an increase in temperature above a predefined threshold, and/or (ii) a decrease in liquid flow beneath a predefined threshold, and/or any other malfunction or condition falling outside accepted operating conditions. Thus, if for some reason the LCTR charging cable 200 is forced into a crimped position causing the cooling liquid 245's cooling functionality to be compromised (and consequently allowing temperatures in the cable to rise), the sensor 291 may generate a signal indicating that an unsafe condition is present (e.g., that there was an increase in temperature above a predefined threshold, and/or (ii) a decrease in liquid flow beneath a predefined threshold, and/or any other malfunction or condition falling outside accepted operating conditions), and control logic or physical computer processor(s) may in response thereto actively engage the pump to temporarily increase liquid pressure in hose 140 (suddenly or gradually) in an effort to untangle or otherwise reposition LCTR charging cable 200 (with the goal of returning the LCTR charging cable 200 to safer operating temperatures). Although discussed herein with specific reference to FIG. 2, such features may be employed in any and all embodiments of the LCTR charging cable of the present disclosure.

Figure 3:
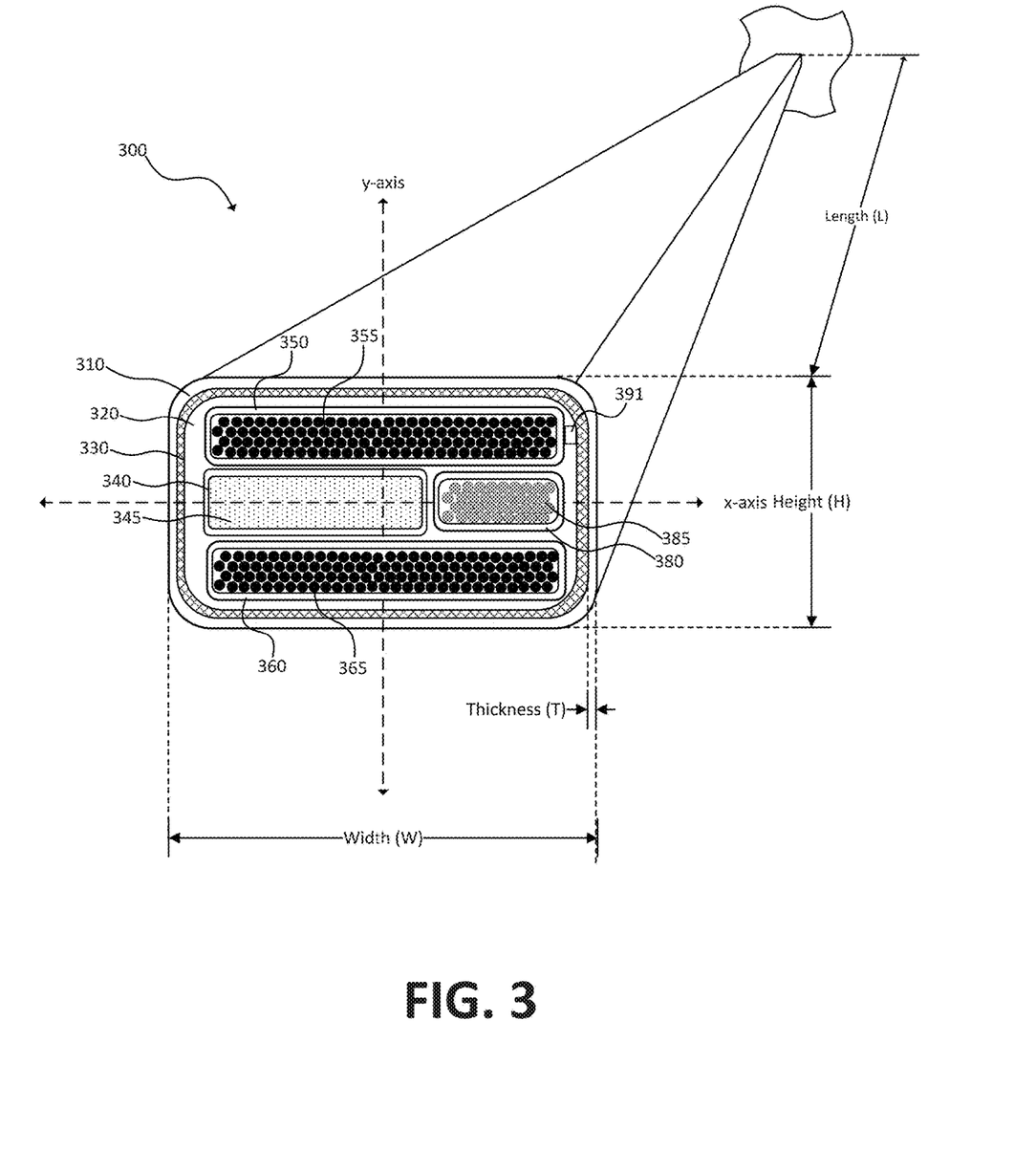
FIG. 3 depicts a cross-section perspective view of a two-phase LCTR charging cable in accordance with one or more embodiments of the present disclosure.
Figure 4:
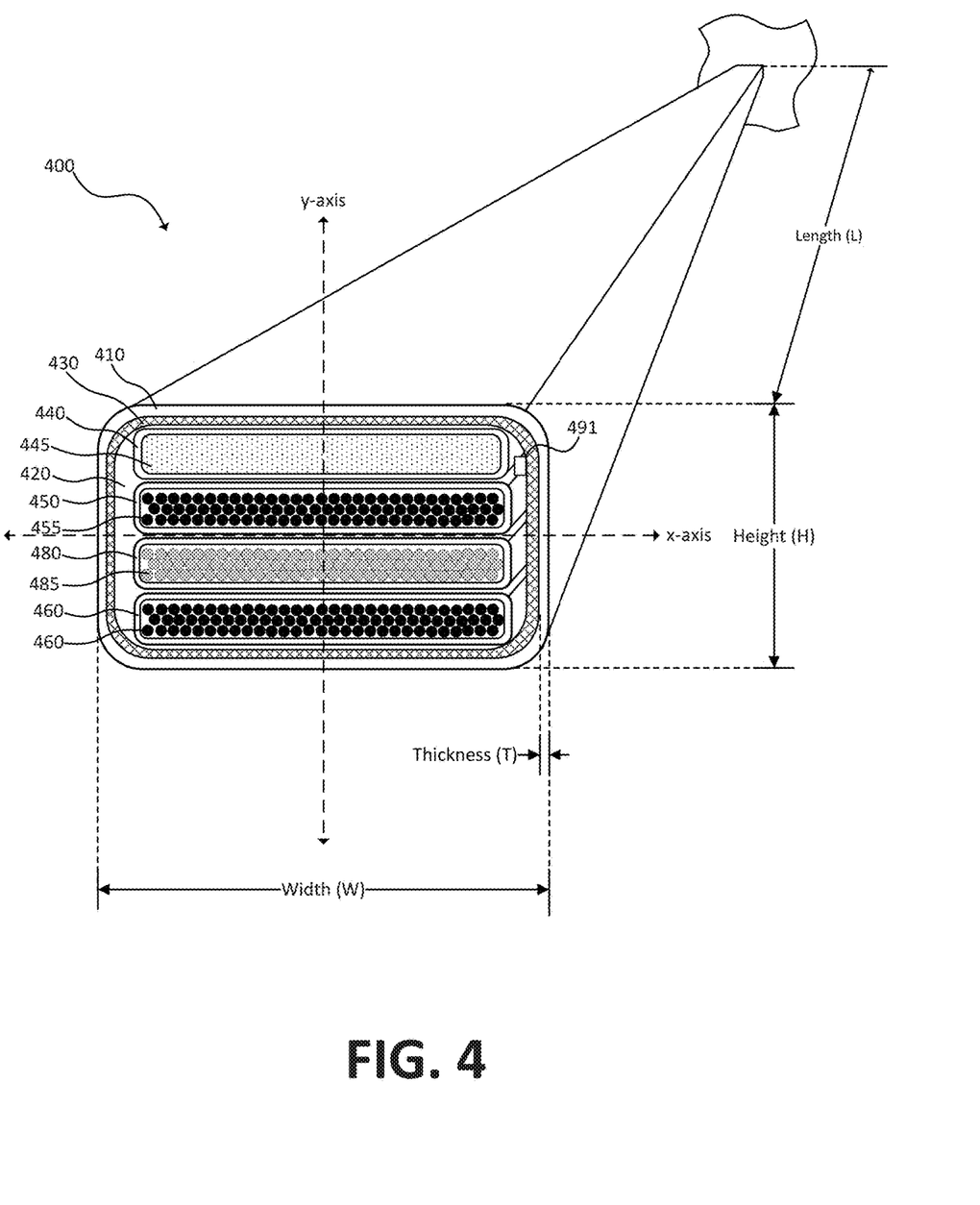
FIG. 4 depicts a cross-section perspective view of a two-phase LCTR charging cable in accordance with one or more embodiments of the present disclosure.
Figure 5:
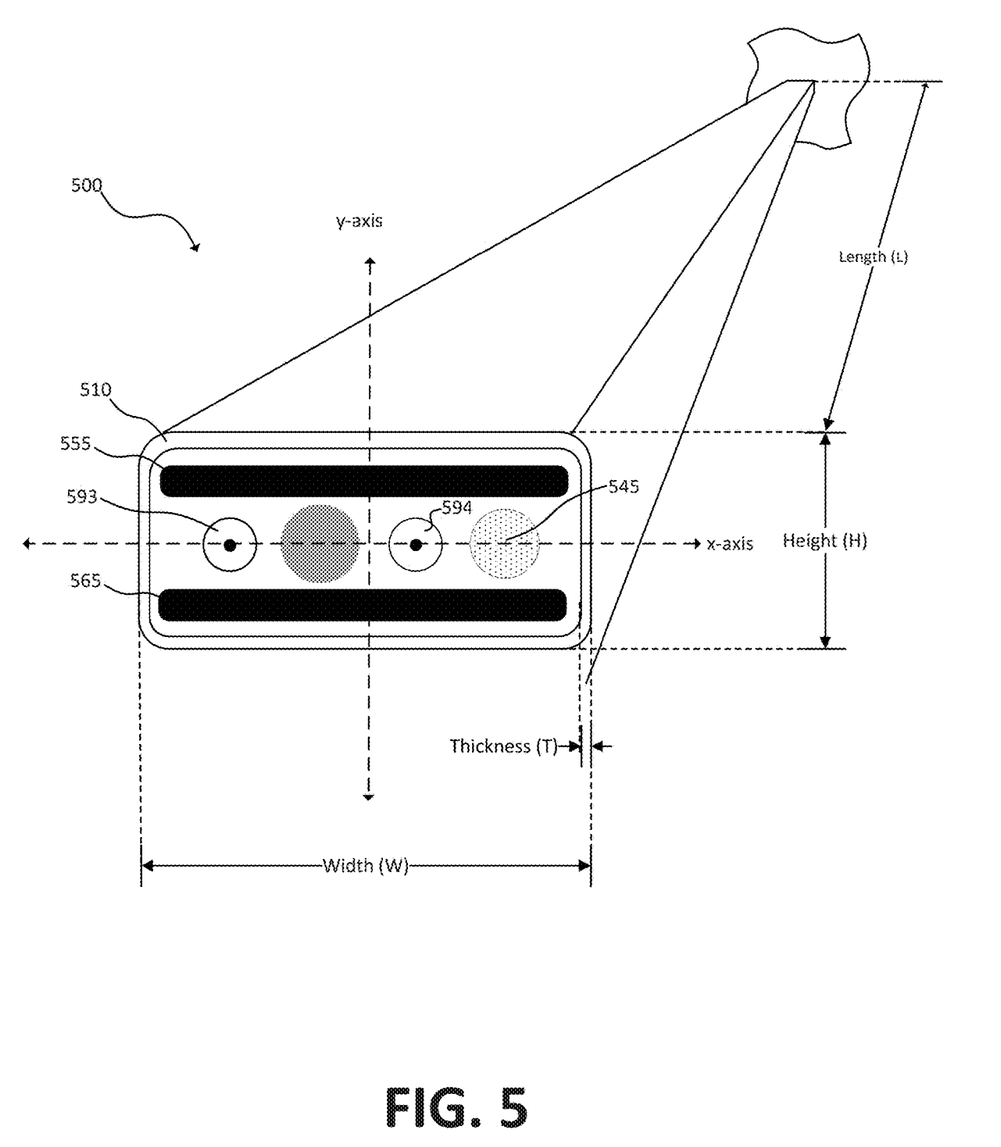
FIG. 5 depicts a cross-section perspective view of a two-phase LCTR charging cable including communication lines in accordance with one or more embodiments of the present disclosure.

FIGS. 3-5 depict one or more variations of the LCTR charging cable technology disclosed herein, in accordance with one or more embodiments of the present disclosure.

FIG. 3 depicts a cross-section perspective view of a two-phase LCTR charging cable in accordance with one or more embodiments of the present disclosure. As shown in FIG. 3, in some embodiments LCTR charging cable 300 may include a hose 340 having at least two flat sides, the hose 340 sandwiched between a first insulation jacket 350 covering a first conductor 355 and a second insulation jacket 360 covering a second conductor 365. The LCTR charging cable 300 also includes a ground insulation jacket 380 covering a ground conductor 385 sandwiched between the first insulation jacket 350 covering first conductor 355 and the second insulation jacket 360 covering second conductor 365, and bordered on at least one side by a different substantially flat side of hose 340. All such variants and/or modifications discussed above in connection with embodiments described with reference to FIGS. 1-2 are equally applicable to the embodiments of FIG. 3 and equivalents.

FIG. 4 depicts a cross-section perspective view of a two-phase LCTR charging cable in accordance with one or more embodiments of the present disclosure. As shown in FIG. 4, in some embodiments LCTR charging cable 400 may include a layered arrangement as between the liquid 445 (or hose 440 containing the liquid), the first conductor 455 (or first insulation jacket 450 carrying the first conductor), the second conductor 465 (or second insulation jacket 460 carrying the first conductor), and/or the ground conductor 485 (or ground insulation jacket 480 carrying the ground conductor). As shown, in some embodiments, the liquid 445 (or hose 440 containing the liquid), the first conductor 455 (or first insulation jacket 450 carrying the first conductor), the second conductor 465 (or second insulation jacket 460 carrying the first conductor), and/or the ground conductor 485 (or ground insulation jacket 480 carrying the ground conductor) each display substantially rectangular cross-sectional profiles such that, in the layered arrangement, at least one flat side of each of the foregoing may be aligned flush with at least one flat side of another one of the foregoing.

FIG. 5 depicts a cross-section perspective view of a two-phase LCTR charging cable including communication lines in accordance with one or more embodiments of the present disclosure. As noted in the background section of this disclosure, a major drawback with conventional charge cables is their tendency to become tangles. FIG. 5 depicts an embodiment of the present disclosure that, while not including a cooling liquid 545 contained within a jacket or hose that displays at least one flat side, does include the sheath 510 and/or a first conductor 555 and/or a second conductor 565 arranged with at least one substantially flat side and configured such that bending about the y-axis will be more difficult than bending about the x-axis, as what has been described herein with reference to FIGS. 1-4. FIG. 5 also demonstrates that any one or more other components may be disposed within sheath 510 to add functionality and/or structure to the LCTR charging cable 500. For example, in some embodiments LCTR charging cable 500 may include one or more communication lines 593 and/or 594 configured to carry communication signals and/or to facilitate communication across LCTR charging cable 500.

Figure 6:
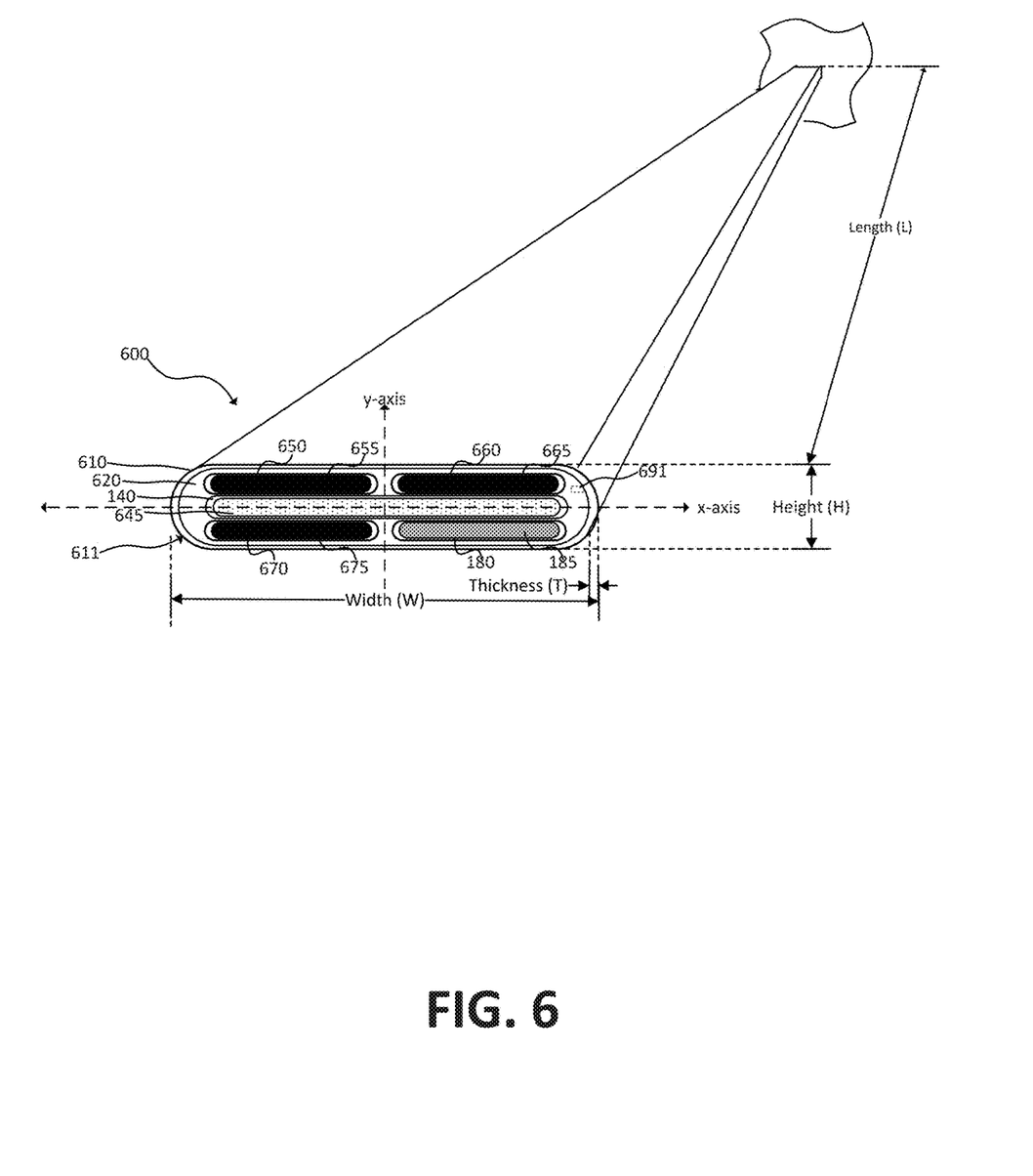
FIG. 6 depicts a cross-section perspective view of a three-phase LCTR charging cable in accordance with one or more embodiments of the present disclosure.

FIG. 6 depicts a cross-section perspective view of a three-phase LCTR charging cable in accordance with one or more embodiments of the present disclosure. As shown, the LCTR charging cable 600 of FIG. 6 is configured similarly to the LCTR charging cable 100 depicted in FIG. 1, but here displays a more flattened cross-sectional profile than that of FIG. 1. It should be appreciated by one having ordinary skill in the art that the LCTR charging cable embodiments of the present disclosure may display a relatively thin profile in one direction, and a relatively wide profile in another (often orthogonal) direction. For example, and in particular with reference to FIGS. 1-6, some embodiments of the disclosure may display a Height (H) dimension that is between 2% and 95% of the Width (W) dimension.

Figure 7:
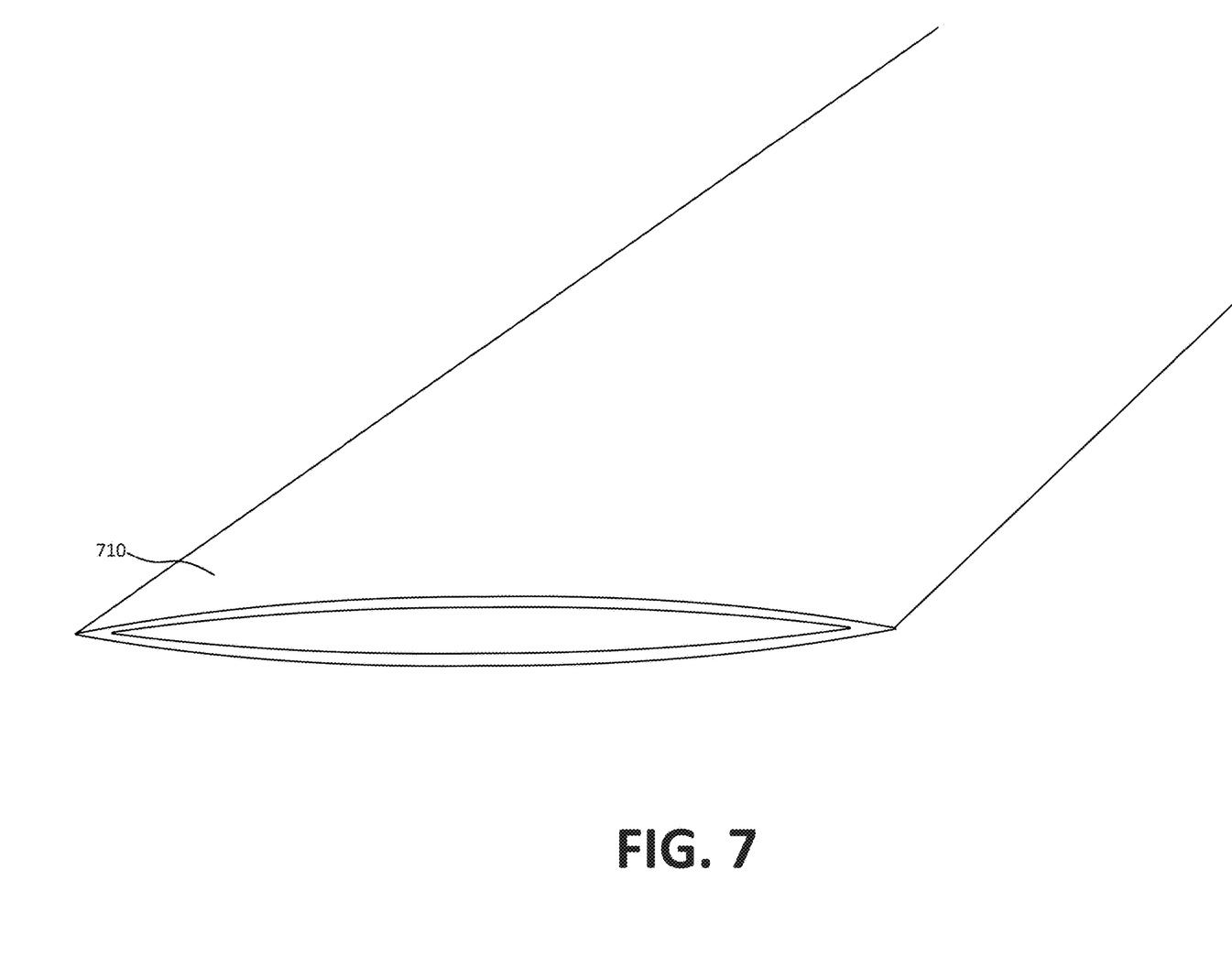
FIG. 7 depicts a cross-section perspective view of an exemplary sheath in accordance with one or more embodiments of the present disclosure.

For purposes of this disclosure, "substantially flat" refers not only to the condition of being perfectly flat (e.g. a perfectly flat side), but in many embodiments of the present disclosure may refer to some imperfectly flat structures. For example, a "substantially flat" side of sheath 110 may actually have slight curvature. FIG. 7 depicts a cross section of an exemplary sheath 710 with such a slight curvature, in accordance with one or more embodiments of the present disclosure, that, while having two sides that are not perfectly flat (i.e. displaying a slight curvature), have sides that may be considered "substantially flat" for purposes of this disclosure. It should be understood that all such variants are intended to fall within the scope of the present disclosure.

Although the system(s), method(s), and/or devices of the present disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

The specification has described methods, devices, and systems for providing a liquid-cooled tangle resistant charging cable. The illustrated features are set out to explain the exemplary embodiments shown and/or described, and it should be anticipated that ongoing technological development will change the manner in which particular features/functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

The invention claimed is:

1. A liquid-cooled tangle-resistant charging cable comprising:
a sheath defining a cavity, the sheath having a width dimension, a height dimension, a thickness dimension and a length dimension; wherein the width dimension is larger than the height dimension, and the length dimension is larger than both the height dimension and the width dimension;
a first conductor disposed in the cavity, the cross-sectional profile of the first conductor being non-circular and having at least one substantially flat side;
second conductor disposed in the cavity;
a third conductor disposed in the cavity;
a hose disposed in the cavity and configured to carry a cooling liquid, the cross-sectional profile of the hose being non-circular and having at least one flat side; and
a first insulation jacket disposed in the cavity and configured to cover at least a portion of the first conductor; a second insulation jacket disposed in the cavity and configured to cover at least a portion of the second conductor; and a third insulation jacket disposed in the cavity and configured to cover at least a portion of the third conductor;
wherein the at least one substantially flat side of the first conductor is adjacent to the at least one substantially flat side of the hose.

2. The liquid-cooled tangle-resistant charging cable of claim 1, further comprising a ground conductor disposed within the cavity.

3. The liquid-cooled tangle-resistant charging cable of claim 1, wherein the substantially flat side of the hose abuts between 15% and 100% of the substantially flat side of the first conductor by surface area.

4. The liquid-cooled tangle-resistant charging cable of claim 3, wherein the substantially flat side of the hose abuts between 15% and 100% of the substantially flat side of the second conductor by surface area.

5. The liquid-cooled tangle-resistant charging cable of claim 4, wherein the substantially flat side of the hose abuts between 15% and 100% of the substantially flat side of the third conductor by surface area.

6. The liquid-cooled tangle-resistant charging cable of claim 1, wherein the substantially flat side of the hose abuts between 15% and 100% of the substantially flat side of the first insulation jacket by surface area.

7. The liquid-cooled tangle-resistant charging cable of claim 6, wherein the substantially flat side of the hose abuts between 15% and 100% of the substantially flat side of the second insulation jacket by surface area.

8. The liquid-cooled tangle-resistant charging cable of claim 7, wherein the substantially flat side of the hose abuts between 15% and 100% of the substantially flat side of the third insulation jacket by surface area.

9. The liquid-cooled tangle-resistant charging cable of claim 1, wherein the first conductor comprises multiple metallic wires bundled together such that the outer cross-sectional profile of the bundled metallic wires is substantially rectangular.

10. The liquid-cooled tangle-resistant charging cable of claim 1, wherein the sheath is made of a material that changes pigment based on changes in temperature.

11. A liquid-cooled tangle-resistant charging cable comprising:
a sheath defining a cavity, the sheath having a width dimension, a height dimension, a thickness dimension and a length dimension; wherein the width dimension is larger than the height dimension, and the length dimension is larger than both the height dimension and the width dimension;
a first conductor disposed in the cavity, the cross-sectional profile of the first conductor being non-circular and having at least one substantially flat side;
a hose disposed in the cavity and configured to carry a cooling liquid, the cross-sectional profile of the hose being non-circular and having at least one flat side; and
a thermistor coupled to the first conductor, wherein current flow is reduced responsive to the thermistor signaling that the temperature of the first conductor is above a predefined level;
wherein the at least one substantially flat side of the first conductor is adjacent to the at least one substantially flat side of the hose.

12. The liquid-cooled tangle-resistant charging cable of claim 1, further comprising a thermistor coupled to the first conductor, wherein current flow is terminated responsive to the thermistor signaling that the temperature of the first conductor is above a predefined level.

13. A liquid-cooled tangle-resistant charging cable comprising:

a sheath defining a cavity, the sheath having a width dimension, a height dimension, a thickness dimension and a length dimension; wherein the width dimension is larger than the height dimension, and the length dimension is larger than both the height dimension and the width dimension;

a first conductor disposed in the cavity, the cross-sectional profile of the first conductor being non-circular and having at least one substantially flat side;

a hose disposed in the cavity and configured to carry a cooling liquid, the cross-sectional profile of the hose being non-circular and having at least one flat side;

wherein the at least one substantially flat side of the first conductor is adjacent to the at least one substantially flat side of the hose; and wherein the sheath is configured to display a bending stiffness in a first direction (or about a first axis) that is greater than the bending stiffness in a second direction (or about a second axis).

14. The liquid-cooled tangle-resistant charging cable of claim 13, wherein the first axis and the second axis are orthogonal.

15. The liquid-cooled tangle-resistant charging cable of claim 1, further comprising an armor layer disposed between the sheath and the first insulation jacket, wherein the armor layer is configured with a bending stiffness in a first direction (or about a first axis) that is greater than the bending stiffness in a second direction (or about a second axis).

* * * * *